United States Patent
Mitjana et al.

(10) Patent No.: US 7,609,677 B2
(45) Date of Patent: Oct. 27, 2009

(54) INTERNET PROTOCOL BASED INFORMATION TRANSMISSION IN A RADIO COMMUNICATION SYSTEM

(75) Inventors: Enric Mitjana, München (DE); Maximilian Riegel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 284 days.

(21) Appl. No.: 10/507,850

(22) PCT Filed: Mar. 14, 2003

(86) PCT No.: PCT/EP03/02716

§ 371 (c)(1),
(2), (4) Date: Apr. 25, 2005

(87) PCT Pub. No.: WO03/079707

PCT Pub. Date: Sep. 25, 2003

(65) Prior Publication Data
US 2005/0174959 A1    Aug. 11, 2005

(30) Foreign Application Priority Data
Mar. 15, 2002  (EP) .................. 02006022

(51) Int. Cl.
*H04Q 7/00*    (2006.01)
(52) U.S. Cl. .................. 370/333; 370/328; 370/331; 370/332
(58) Field of Classification Search .......... 370/380, 370/401, 328, 355, 474, 333, 331, 332
See application file for complete search history.

(56) References Cited

U.S. PATENT DOCUMENTS

| 2001/0011312 | A1* | 8/2001 | Chu .......................... 710/64 |
| 2002/0141395 | A1* | 10/2002 | Chang ....................... 370/355 |
| 2002/0150091 | A1* | 10/2002 | Lopponen et al. ........... 370/389 |
| 2005/0009528 | A1* | 1/2005 | Iwamura et al. ............. 455/446 |

FOREIGN PATENT DOCUMENTS

DE    199 56 318    5/2001

(Continued)

OTHER PUBLICATIONS

M. Kouda et al. "Proxy Mechanism of Multiplexing TCP Connections over Satellite Internet", Technical Report of IEICE (Mar. 2002), p. 69, including Abstract.

(Continued)

*Primary Examiner*—Vincent P Harper
*Assistant Examiner*—Fred A Casca
(74) *Attorney, Agent, or Firm*—Staas & Halsey LLP

(57) ABSTRACT

Information is transmitted in a communication system having at least two communicating devices using a link between the at least two communicating devices provided at least via a radio communication interface of a radio communication system having a number of base stations that are interlinked via a base station network. The link is realized using channels arranged in hierarchical protocol layers. Channel-specific information is given to a hierarchical higher channel at least from one channel for the radio link between a communicating device and at least one base station. This hierarchically higher channel is an Internet protocol-based channel for the overall link between the at least two communicating devices.

16 Claims, 2 Drawing Sheets

FOREIGN PATENT DOCUMENTS

| | | |
|---|---|---|
| JP | 2003-516028 | 5/2003 |
| JP | 2003-521155 | 7/2003 |
| WO | 01/39432 | 3/2001 |
| WO | 01/54351 | 7/2001 |

OTHER PUBLICATIONS

Andreas Jungmaier et al., "SCTP-A Multi-link End-to-end Protocol for IP-based Networks", International Journal of Electronics and Communications, vol. 55, No. 1, 2000, pp. 46-54.

Jukka Manner et al., "Exploitation of Wireless Link QoS Mechanisms in IP QoS Architectures", Proceedings of SPIE, vol. 4524, 2001, pp. 273-283.

Servane Bonjour et al., "IP Convergence Layer with QoS Support for Hiperlan/2", 10 pp.

M. Riegel et al., "Mobile SCTP", Internet Draft Memo, Network Working Group, Feb. 20, 2002, pp. 1-8.

* cited by examiner

20 — Link two communicating devices for transmission using channels arranged in hierarchical protocol layers.

22 — Supply channel-specific information from one channel to a hierarchically higher Internet protocol based channel.

INTERNET PROTOCOL BASED INFORMATION TRANSMISSION IN A RADIO COMMUNICATION SYSTEM

CROSS REFERENCE TO RELATED APPLICATION

This application is based on and hereby claims priority to European Application No. 020 06 022.4 filed on Mar. 15, 2002, the contents of which are hereby incorporated by reference.

BACKGROUND OF THE INVENTION

1. Field of the Invention

The invention relates to a method for transmitting information in a communication system with at least two communicating devices.

2. Description of the Related Art

Communication systems are becoming increasingly important not only in the commercial but also in the private sector. Strenuous efforts are being made to link cable-based communication systems with radio communication systems. The resulting hybrid communication systems are bringing about an increase in the number of available services, but also allow greater flexibility on the communications side. Thus devices are being developed which can use different systems (multi homing).

In this context, radio communication systems are acquiring great importance because of the user mobility which they allow.

In radio communication systems, information (e.g. voice, image information, video information, SMS [Short Message Service] or other data) is transmitted across a radio interface between transmitting and receiving station (base station or user station) using electromagnetic waves. These electromagnetic waves are emitted using carrier frequencies within the frequency band provided for the relevant system.

For the introduced GSM system (Global System for Mobile Communications), frequencies in the 900, 1800 and 1900 MHz range are used. These systems basically transmit voice, fax and short messages (SMS) as well as digital data.

For future mobile communication systems employing CDMA or TD/CDMA transmission, such as UMTS (Universal Mobile Telecommunication System) or other third-generation systems, frequencies in the frequency band around 2000 MHz are envisioned. These third-generation systems are being developed with the objectives of worldwide radio coverage, a large range of services for data transmission and above all flexible management of the capacity of the radio interface, which is the interface with the least resources in radio communication systems. With these radio communication systems, it is to be possible above all, through flexible management of the radio interface, to enable the user station to transmit and/or receive a large amount of data at a high data rate.

In these radio communication systems, access by stations to the common radio resources of the transmission medium, such as time, frequency, power or space, will be controlled by multiple access (MA).

With time division multiple access (TDMA), each transmit and receive frequency band is subdivided into time slots, one or more cyclically repeated time slots being assigned to the stations. The radio resource "time" is separated by TDMA on a station-specific basis.

With frequency division multiple access (FDMA), the entire frequency range is subdivided into narrowband ranges, one or more narrow frequency bands being assigned to the stations. The radio resource "frequency" is separated by FDMA on a station-specific basis.

With code division multiple access (CDMA), the power/information to be transmitted is encoded on a station-specific basis by a spreading code including a large number of individual so-called chips, which means that the power to be transmitted is randomly spread over a large frequency range according to the code. The spreading codes used by different stations within a cell/base station are each mutually orthogonal or essentially orthogonal, which means that a receiver detects the signal power assigned to it and suppresses other signals. The radio resource "power" is separated by the spreading code on a station-specific basis by CDMA.

In the case of orthogonal frequency division multiplexing (OFDM), the data is transmitted wideband, the frequency band being subdivided into equidistant, orthogonal subcarriers so that the simultaneous phase offset of the subcarriers clamps a two-dimensional data flow in the time-frequency domain. The radio resource "frequency" is separated by orthogonal subcarriers on a station-specific basis by OFDM. The aggregated data symbols transmitted on the orthogonal subcarriers during a time unit are termed OFDM symbols.

The multiple access methods can be combined. For example, many radio communication systems use a combination of TDMA and FDMA, each narrow band of frequencies being subdivided into time slots.

For the UMTS mobile communication system mentioned, a distinction is drawn between so-called FDD (frequency division duplex) mode and TDD (time division duplex) mode. TDD mode is particularly characterized by the fact that a common frequency band is used both for signal transmission in the uplink (UL) direction and in the downlink (DL) direction, whereas FDD mode uses a different frequency band in each case for both transmission directions.

In second and/or third-generation radio communication links, information can be transmitted on a circuit switched (CS) or packet switched (PS) basis.

For information transmission, the two or more communicating devices are linked at least via a radio communication interface of a radio communication system having a plurality of base stations interlinked via a base station network, the link being implemented on the basis of channels arranged in hierarchical protocol layers. These layers are described e.g. in the ISO/OSI reference model which was created for extensive standardization of communication systems.

Generally there is a mobile terminal as the communicating device on one side of the radio interface and, on the other side, a base station connected to a core network via the base station network. These have a uniform function, but may have different designations depending on the technical system, such as BTS (base transceiver station) in the GSM system, Node B in the UMTS system or AP (access point) in the HIPERLAN/2 system.

Modern mobile communication systems such as GPRS (General Packet Radio Service) or UMTS are based on proprietary protocols in order to be able to provide a high degree of mobility. This leads to disadvantages particularly in hybrid communication systems which are composed of independently operating communication systems. The proprietary radio communication protocols are not IP (Internet protocol) transparent. Because of the different types of protocols, an Internet protocol based end to end connection is not therefore possible.

Even if an Internet protocol based channel is used for the overall link between two communicating devices of a communication system which are communicating with one another across a radio communication interface, there are still disadvantages because of the protocol structures.

Thus a radio link from a base station to a mobile terminal across the radio interface will possibly be kept in a certain radio channel (e.g. frequency), even though a better quality radio link could be ensured in another available radio channel (e.g. using another frequency). Add to this the problem of the possibly large time invariance of the radio link.

SUMMARY OF THE INVENTION

An object of the present invention is therefore to disclose a method and a communications system of the abovementioned type by which communication can be improved, the quality of the radio link having to be taken into account as far as possible.

According to the invention, for the radio link between a communicating device and at least one base station, information is supplied at least from one channel on a channel-specific basis to a hierarchically higher channel which is an Internet protocol based channel for the overall link between the two or more communicating devices.

Within the scope of the present invention, the channel specific-information includes in particular layer-specific information which, e.g. according to the ISO/OSI model, is not intended for forwarding and/or processing at higher layers, but is used only for information in the same and/or possibly lower layers. The invention therefore means a certain break with the strict system architecture of the protocol layers, the information to be forwarded to hierarchically higher channels or layers being primarily Layer 1 and/or Layer 2 information as defined in the ISO/OSI model. The hierarchically higher channel or channels to which the information is transmitted according to the invention from hierarchically subordinate channels mainly relate to Layer 4 or higher layers in accordance with the ISO/OSI model.

By delivering the channel-specific information to one or more hierarchically higher channels, it is possible to operate proactively in the hierarchically higher layer so that altogether the communication system is provided with a fast and effective way of keeping or setting up the best link if, for example, indications of quality impairments in respect of the radio link are present.

BRIEF DESCRIPTION OF THE DRAWINGS

The above and/or other aspects and advantages of the invention will become apparent, and more readily appreciated from the following description of the preferred embodiments, taken in conjunction with accompanying drawings of which.

DETAILED DESCRIPTION OF THE PREFERRED EMBODIMENT

Figure 1:
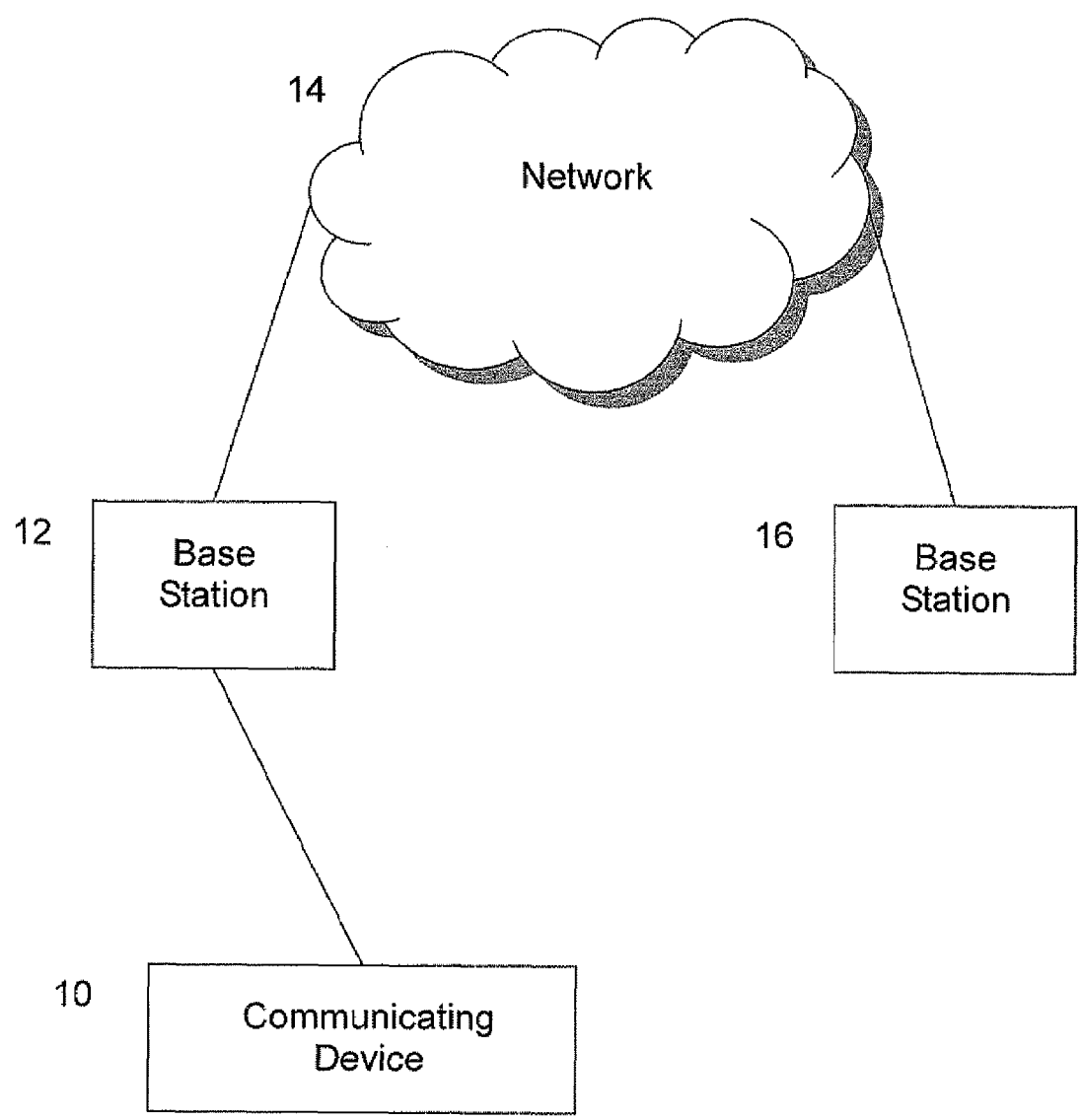
FIG. 1 illustrates an example communication system.
Figure 2:
FIG. 2 illustrates a method of transmitting information in the example communication system.

FIG. 1 illustrates an example communication system which may be used with one or more of the following embodiments, while FIG. 2 illustrates a method of transmitting information in the example communication system. In one embodiment of the invention, specific information about the physical radio link between a communicating device 10 and at least one base station 12 is supplied from a bit transmission channel to the hierarchically higher Internet protocol based channel (operations 20 and 22 in FIG. 2). This means that Layer 1 information is transmitted to higher layers.

An additional or alternative possibility is for channel-specific information to be supplied to the hierarchically higher Internet protocol based channel from a data link layer channel for ensuring the radio link between a communicating device 10 and at least one base station 12. With this measure, Layer 2 information is transmitted to higher layers, the data link layer being decomposable, for example, into the sublayers medium access control (MAC), radio link control (RLC), packet data convergence protocol (PDCP) and broadcast/multicast control (BMC).

The information supplied to hierarchically higher channels can basically encompass and contain all suitable information. In particular, parameter information in respect of the radio link between communicating device 10 and base station can 12 be communicated to higher layers. In particular, this relates to information regarding the quality of service (QOS) of the radio link, the parameter information possibly containing in particular test results—e.g. from radio channel quality measurements.

However, the information can also relate to calculations from information in respect of the radio link between communicating device 10 and base station 12, this applying particularly to calculations taking place at Layer 1 and/or for Layer 1.

The information can advantageously relate to control information regarding the radio link between communicating device 10 and base station 12, in particular information from the RLC layer being communicable.

In a development of the invention, an Internet protocol based channel is used for the link between the two or more communicating devices in accordance with SCTP protocol. This SCTP (stream control transmission protocol) relates to a recently developed technology for transporting signaling messages over IP-based cable networks. Its use in conjunction with radio communication networks has not so far been envisioned. Surprisingly, however, it has also been shown that this protocol can be advantageously used for radio communication networks.

In contrast to other Internet protocol communications such as TCP/IP, SCTP allows one or more further IP address pairs via which other physical links could be immediately activated to be reserved in addition to the pair of IP addresses active in the physical link. In the event of interference or interruption to communications, a much faster changeover to an alternative physical link can therefore be performed.

Thus, for example, in a mobile terminal which is connected e.g. to an Internet server via the radio interface and the associated core network 14, a number of IP addresses can be allocated via which a link can be established if necessary.

Within the scope of the invention, various access networks with a radio communication interface can be used, the different radio communication systems being employed additively or alternatively. The different access networks can be, for example, a UMTS system, a GSM system and/or a WLAN system (wireless LAN—local area network). In particular the WLAN system can be specified according to the HIPERLAN/2 standard, the IEEE 802.11a standard or the HiSWAN-A standard.

In a development of the invention, a changeover in respect of at least one multiple access medium and/or a handover is initiated on the basis of the information supplied to hierarchically higher channels. Thus, for example, on the basis of the transmitted information, the frequency, time slot and/or code used can be changed. In the case of a handover, all known types of the handover can be initiated, such as the variants known as so-called hard (break-before-make) or soft (make-before-break) handover.

With the communication system according to the invention for implementing the described method, means are provided for transmitting channel-specific information for the radio link between a communicating device 10 and at least one base station 12 from one channel to a hierarchically higher channel which is an Internet protocol based channel for the overall link between the two or more communicating devices.

In addition, further means for performing the appropriately modified method described above can be present in the communication system.

The advantages of the invention will now be explained in greater detail with reference to three examples:

On the basis of the invention it can be ensured that the best radio link always exists. Thus, for example, it is possible, in a scenario where a mobile terminal (such as communicating device 10) is in visual contact with a plurality of base stations (such as base stations 12 and 16), to change between different links, taking into account the quality of the individual links. For example, in a conference room with coverage by two stations a laptop can switch over the link from one base station to the other if, for example, a person is standing between laptop and the initially active base station and thus the initial link (line of sight) is interrupted or impaired.

A similar changeover can take place for handover between different base stations of the same technical radio communication system. If, for example, a radio link is deteriorating, the mobile station can initiate an IP address change before the link breaks up completely.

A handover between base stations belonging to different radio communication systems is also possible. For example, one base station can belong to the UMTS network and another base station can be part of a WLAN network. A changeover can be initiated here, for example, because of the quality of the link, because of network-specific characteristics of the different network links such as different costs and/or because of network-specific availabilities of special services.

The invention results in improved performance while at the same time reducing the signaling complexity and therefore also reducing interference.

Essentially, in conjunction with the inventive communication of the channel-specific information to hierarchically higher channels, knowledge acquired in connection with the publicly sponsored projects BRAIN and MIND can be used. This relates particularly to the so-called $IP_2W$ interface (IP to wireless interface).

The invention claimed is:

1. A method for transmitting information in a communication system with at least two communicating devices, comprising:
   linking the at least two communicating devices for transmission of the information at least via a radio communication interface of a radio communication system having base stations interlinked via a base station network, said linking using channels arranged in hierarchical protocol layers;
   supplying channel-specific information, at least from one channel for a radio link between one of the communicating devices and at least one base station, to a hierarchically higher Internet protocol based channel for an overall link between the at least two communicating devices; and
   initiating at least one of a changeover in respect of at least one multiple access medium and a handover based on the channel-specific information supplied from the channel for the radio link to the hierarchically higher Internet protocol based channel for the overall link.

2. A method according to claim 1, wherein said supplying sends the channel-specific information to the hierarchically higher Internet protocol based channel via a bit transmission channel to provide specific information about a physical radio link between the one of the communicating devices and the at least one base station.

3. A method according to claim 2, wherein said supplying supplies the channel-specific information to the hierarchically higher Internet protocol based channel via a data link layer channel to ensure the radio link between the at least one of the communicating devices and the at least one base station.

4. A method according to claim 2, wherein the channel-specific information relates to parameter information about the radio link between the at least one of the communicating devices and the at least one base station.

5. A method according to claim 2, wherein the channel-specific information relates to calculations on data relating to the radio link between the at least one of the communicating devices and the at least one base station.

6. A method according to claim 3, wherein the channel-specific information is control information related to the radio link between the at least one of the communicating devices and the at least one base station.

7. A method according to claim 1, wherein said linking further uses an Internet protocol based channel between the at least two communicating devices in accordance with a stream control transmission protocol.

8. A method according to claim 7, wherein said linking uses different access networks to provide the radio communication interface.

9. A communication system, comprising:
   at least two communicating devices;
   base stations;
   a base station network interlinking said base stations;
   means for transmitting channel-specific information at least from one channel for a radio link between one of said communicating devices and at least one of said base stations to a hierarchically higher Internet protocol based channel for an overall link between said communicating devices; and
   means for initiating at least one of a changeover in respect of at least one multiple access medium and a handover based on the information transmitted by said transmitting means from the channel for the radio link to the hierarchically higher Internet protocol based channel for the overall link.

10. A communication system according to claim 9, wherein said transmitting means sends the channel-specific information to the hierarchically higher Internet protocol based channel via a bit transmission channel to provide specific information about a physical radio link between the one of said communicating devices and the at least one of said base stations.

11. A communication system according to claim 10, wherein said transmitting means supplies the channel-specific information to the hierarchically higher Internet protocol based channel via a data link layer channel to ensure the radio link between the one of said communicating devices and the at least one of said base stations.

12. A communication system according to claim 10, wherein the channel-specific information relates to parameter information about the radio link between the one of said communicating devices and the at least one of said base stations.

13. A communication system according to claim 11, wherein the channel-specific information relates to calculations on data relating to the radio link between the one of said communicating devices and the at least one of said base stations.

14. A communication system according to claim 11, wherein the channel-specific information is control information related to the radio link between the one of said communicating devices and the at least one of said base stations.

15. A communication system according to claim 10, wherein said linking further uses an Internet protocol based channel between said at least two communicating devices in accordance with a stream control transmission protocol.

16. A communication system according to claim 15, further comprising different access networks providing the radio communication interface.

* * * * *